G. A. HENDERSON.
FIBROUS COMPOSITION AND PROCESS OF MAKING THE SAME.
APPLICATION FILED APR. 8, 1911.
1,040,321.
Patented Oct. 8, 1912.
2 SHEETS—SHEET 2.
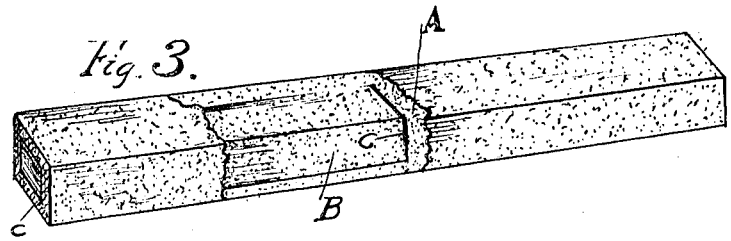
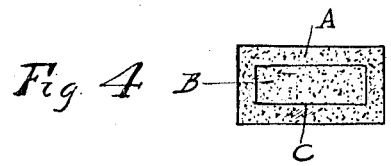
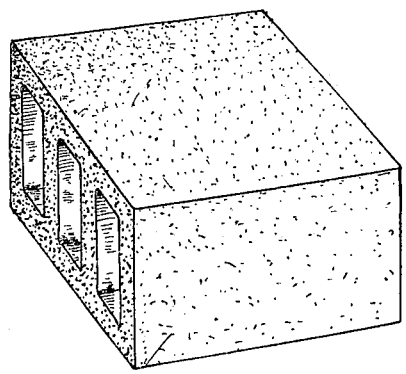
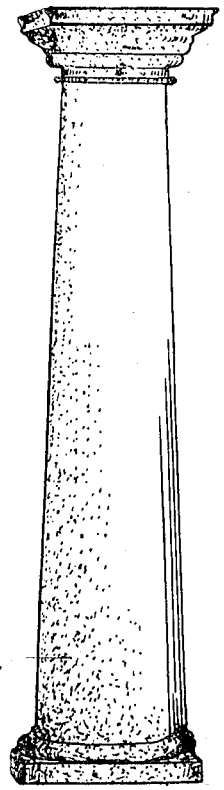
WITNESSES:
Owen Whittington
A. V. Fitzwater
George A. Henderson
INVENTOR.

G. A. HENDERSON.
FIBROUS COMPOSITION AND PROCESS OF MAKING THE SAME.
APPLICATION FILED APR. 8, 1911.
1,040,321.
Patented Oct. 8, 1912.
2 SHEETS—SHEET 1.
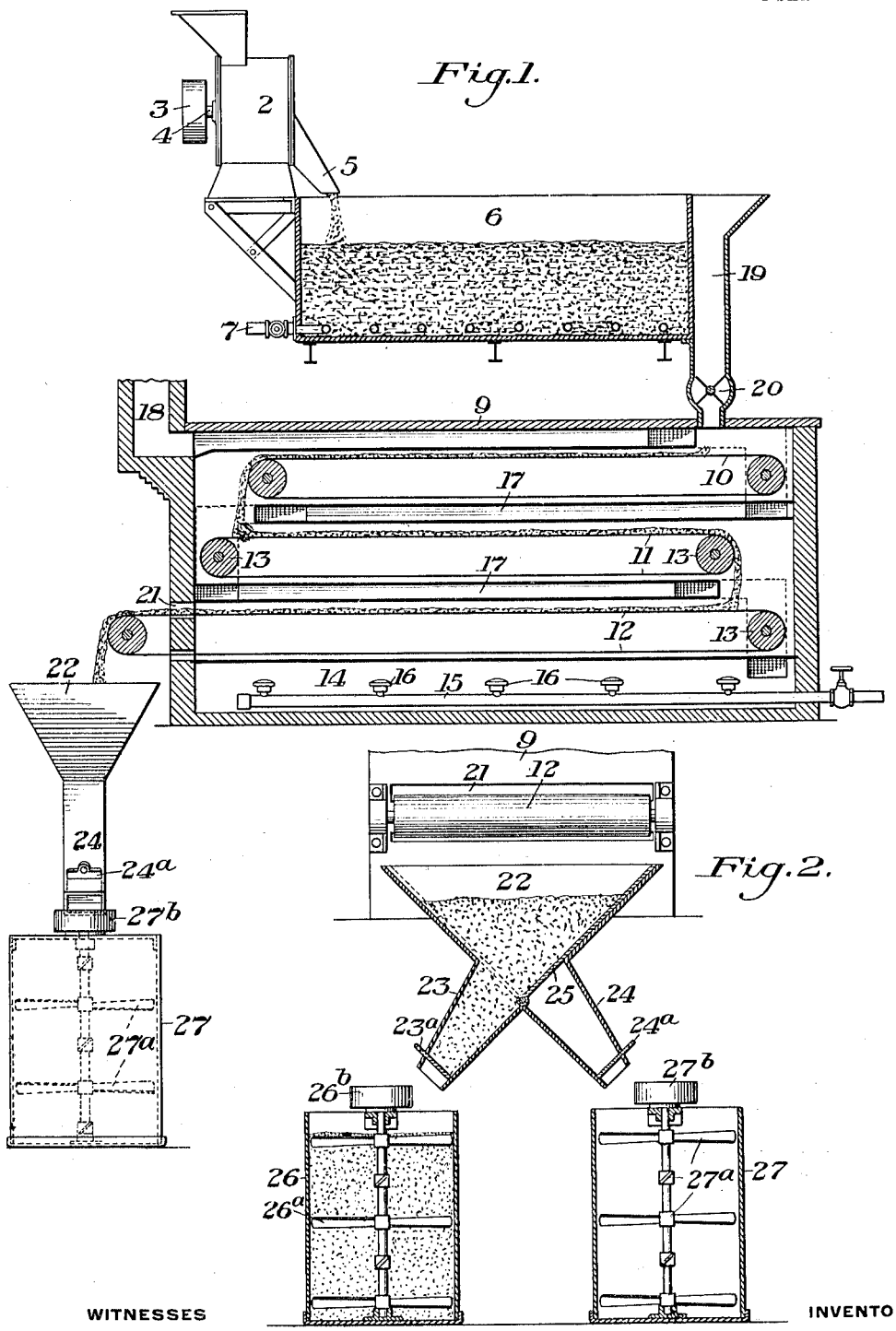

UNITED STATES PATENT OFFICE.

GEORGE A. HENDERSON, OF CHARLESTON, WEST VIRGINIA.

FIBROUS COMPOSITION AND PROCESS OF MAKING THE SAME.

1,040,321.  Specification of Letters Patent.  Patented Oct. 8, 1912.

Application filed April 8, 1911. Serial No. 619,888.

*To all whom it may concern:*

Be it known that I, GEORGE A. HENDERSON, a resident of Charleston, in the county of Kanawha and State of West Virginia, have invented a new and useful Improvement in Fibrous Compositions and Processes of Making the Same, of which the following is a full, clear, and exact description, reference being had to the accompanying drawing, forming part of this specification, in which—

Figure 1 is a side elevation partially in section of an apparatus for carrying out my invention. Fig. 2 is a partial end view, partly in section of the same. Fig. 3 is a perspective view of a tie made of material manufactured by my process. Fig. 4 is a sectional view thereof. Fig. 5 is a perspective view of a hollow building block, and Fig. 6 is a perspective view of a column.

My invention relates to a composition and the process of making the same, which composition can be used for making various articles such as pulp ties, mine timbers, arches, building blocks, columns and other structures.

The object of my invention is to produce a composition for such purposes from chipped material, which will in strength and durability be superior to articles made from timber.

The precise nature of my invention will be best understood by reference to the accompanying drawings, which will now be described, it being premised, however, that various changes may be made in the details of construction of the apparatus by which the process is carried out, without departing from the spirit and scope of my invention, as defined in the appended claims.

In the drawings, the numeral 2 designates a mill or chopping device for grinding or chopping billets of wood into particles or chips of the desired size, and which is driven by means of a pulley 3 on a shaft 4.

5 designates a spout leading from the mill through which the chips pass from the mill.

In the drawings I have shown the mill as adjacent to a tank or vat 6 into which the chips are delivered. The tank or vat is provided with a steam pipe 7 through which steam is admitted for heating the material within the vat to extract the juices and soft pulpy matter from the chips, as hereinafter described.

9 designates a kiln or drying oven which is provided with a plurality of endless conveyers 10, 11 and 12, which pass around suitable drums 13.

14 is a combustion chamber in the lower portion of the kiln or oven having a gas supply pipe 15 which is provided with a plurality of burners 16, which are arranged to heat the oven, the products of combustion passing upwardly through flues 17 and thence out through a stack 18. The flues 17 lie between the endless conveyers and are connected at their ends to each other in such a manner that the products of combustion will have a serial pass from the chamber 14 to the stack 18.

19 is a hopper on the top of the oven, the lower end of which is a feeding device 20 for feeding the material from the hopper to the belt 10.

The endless conveyer 12 passes out through an opening 21 in one end of the oven and the dried material is dropped into a hopper 22. The lower portion of this hopper 22 is provided with outlets 23 and 24, and is also provided with a gate 25 which can be moved so that the material can be fed into the outlet 23 or to the outlet 24, the lower ends of which are provided with gates 23$^a$ and 24$^a$, respectively. Placed immediately below each of these outlets 23 and 24 are the mixers 26 and 27, respectively, which are provided with agitators 26$^a$ and 27$^a$, respectively, and which are arranged to be driven by their respective pulleys 26$^b$ and 27$^b$.

Pulverized material from the mill 2 is delivered to the vat 6, to which is added the proper amount of water and the mixture is then heated by means of the steam pipe 7 in order to abstract all of the sap and essence, and after the material has been boiled a predetermined length of time, the liquid can be drawn off and the moist chips are then shoveled into the hopper 19 from which they are delivered by means of the feeding device 20 to the endless conveyer 10. The chips are moved along with the endless conveyer 10 and are dropped to the conveyer 11 from whence they are dropped to the conveyer 12. The length and speed of these various conveyers are such that the material will be thoroughly dried by the time it passes out through the opening 21 and is delivered to the hopper 22. The material is first fed from the hopper 22 through the chute 23 into the mixer 25 into which is placed the proper proportion of any well known preservative, which is thoroughly mixed with the chips, so that the open pores thereof are impregnated therewith. The material is then removed from the mixer 25 and is again passed through the oven or kiln 9, and after it passes through the oven the second time, it is passed from the hopper 22 to the mixer 26 into which is a heavy bituminous binder and is thoroughly mixed with the chips to completely coat the same. After the chips and binder have been thoroughly mixed, the mixture is removed from the mixer and is molded into blocks or columns, as shown in Figs. 3 to 6, or can be placed on the street and pressed by means of rollers in a manner similar to sheet asphalt. If desired, the material just removed from the mixer 25 can be run through a second kiln or oven similar to the kiln 9, and after it is thoroughly dried it can then be delivered to a mixer similar to the mixer 26, instead of passing it through the same kiln twice.

The advantages of my invention result from the method of manufacturing a composition from chips or fiber from which articles of various types can be made which will be superior to articles made from timber.

By the term "wood particles," as used in the claims, I intend to distinguish from wood pulp, such as is used in paper manufacture.

I claim:

1. A new composition of matter, comprising wood particles from which merely the juice, sap and water have been extracted, said particles being impregnated and coated with a preservative and united by a small quantity of heavy binder, the proportion of binder being merely large enough to coat the particles and bind them to each other; substantially as described.

2. The method of treating wood particles, consisting in extracting the juices, sap, etc., then drying the chips to extract all moisture, then impregnating the particles with a preservative, and then mixing with said particles a small quantity of heavy adhesive compound or preparation, the proportion of said compound being merely large enough to coat the particles and bind them to each other; substantially as described.

3. The method of manufacturing articles from wood particles, consisting in first extracting the juices from the particles, then drying the particles to remove all moisture, then filling the open pores of the particles with a preservative, then mixing the impregnated particles with a small quantity of heavy binder to coat the particles and bind them together, and then pressing the material into shape; substantially as described.

4. The method of manufacturing a composition from wood particles, consisting in first extracting the juices from the particles, then drying the particles to remove all moisture, then filling the open pores of the particles with a preservative, then drying the impregnated particles, and then mixing with the impregnated particles a small quantity of binder to completely coat the particles and bind them together; substantially as described.

5. As a new article of manufacture, particles of wood having the sap, juices and water extracted, the open pores of said particles from which the sap has been extracted being impregnated with a preservative and held together by a small quantity of heavy adhesive binder, there being sufficient binder to completely coat the particles and bind them to each other; substantially as described.

In testimony whereof I have affixed my signature in the presence of two witnesses, this tenth day of January, 1911.

GEORGE A. HENDERSON.

Witnesses:
A. V. FITZWATER,
OWEN WHITTINGTON.